United States Patent
Carmeli et al.

(10) Patent No.: US 11,625,609 B2
(45) Date of Patent: Apr. 11, 2023

(54) INTEGRATION OF EXTERNAL APPLICATIONS INTO DEEP NEURAL NETWORKS

(71) Applicant: International Business Machines Corporation, Armonk, NY (US)

(72) Inventors: Boaz Carmeli, Haifa (IL); Guy Hadash, Haifa (IL); Einat Kermany, Manof (IL); Ofer Lavi, Tel-Aviv (IL); Guy Lev, Tel Aviv (IL); Oren Sar-Shalom, Nes Ziona (IL)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 16/008,058

(22) Filed: Jun. 14, 2018

(65) Prior Publication Data
US 2019/0385060 A1    Dec. 19, 2019

(51) Int. Cl.
*G06N 3/08* (2006.01)
*G06N 3/04* (2006.01)
*G06N 3/084* (2023.01)

(52) U.S. Cl.
CPC ........... *G06N 3/084* (2013.01); *G06N 3/0472* (2013.01)

(58) Field of Classification Search
CPC .............................. G06N 3/084; G06N 3/0472
See application file for complete search history.

(56) References Cited

U.S. PATENT DOCUMENTS

| | | | |
|---|---|---|---|
| 2017/0061326 A1 | 3/2017 | Talathi et al. | |
| 2017/0140265 A1 | 5/2017 | Le et al. | |
| 2017/0140271 A1 | 5/2017 | Reed et al. | |
| 2019/0114417 A1* | 4/2019 | Subbarayan | G06F 40/216 |

OTHER PUBLICATIONS

Neelakantan et al. (Learning a Natural Language Interface with Neural Programmer, Mar. 2017, pp. 1-13) (Year: 2017).*
Neelakantan et al. (Neural Programmer: Inducing Latent Programs with Gradient Descent, Aug. 2016, pp. 1-18) (Year: 2016).*
Liang (Learning Executable Semantic Parsers for Natural Language Understanding, Sep. 2016, pp. 68-76) (Year: 2016).*
Gu et al. (Deep API Learning, Nov. 2016, pp. 631-642) (Year: 2016).*
Zhang et al. (Automatic Parameter Recommendation for Practical API Usage, Jun. 2012, pp. 826-836) (Year: 2012).*
Dahl et al. (Large-Scale Malware Classification Using Random Projections and Neural Networks, 2013, pp. 3422-3426) (Year: 2013).*
Schulman et al.,"Gradient Estimation Using Stochastic Computation Graphs", arXiv:1506.05254, 2016.
(Continued)

*Primary Examiner* — George Giroux
(74) *Attorney, Agent, or Firm* — Dvir Gassner (57) ABSTRACT

During end-to-end training of a Deep Neural Network (DNN), a differentiable estimator subnetwork is operated to estimate a functionality of an external software application. Then, during inference by the trained DNN, the differentiable estimator subnetwork is replaced with the functionality of the external software application, by enabling API communication between the DNN and the external software application.

17 Claims, 4 Drawing Sheets

(56) References Cited

OTHER PUBLICATIONS

Bengio et al., "Estimating or Propagating Gradients Through Stochastic Neurons for Conditional Computation", arXiv:1308.3432v1, 2013.
Bordes et al., "Learning End-to-End Goal-Oriented Dialog", ICLR 2017, 2017.
Grathwohl et al., "Backpropagation through the Void: Optimizing control variates for black-box gradient estimation", ICLR 2018, 2018.

* cited by examiner

INTEGRATION OF EXTERNAL APPLICATIONS INTO DEEP NEURAL NETWORKS

BACKGROUND

The invention relates to the field of deep neural networks (DNNs).

End-to-end learning with DNNs has taken the stage in the past few years, achieving state-of-the-art performance in multiple domains including computer vision, text analysis, and speech recognition. In end-to-end learning, the learning procedures can train a classifier in a single end-to-end step, which eliminates the need for complex multi-stage machine learning pipelines.

One of the challenges faced by the industry is integrating DNNs with external applications. Enabling a DNN to use, or interact with, an external application, e.g., through Application Programming Interfaces (APIs), can lead to superior solutions since functionalities or logic provided by external application can be included in, or be made part of, the DNN. Accessing an API is accomplished via its input and output parameters. For example, consider the simple question: "Is 7.2 greater than 4.5?". This question could be answered by letting a DNN handle the natural language processing part, and accessing a simple API to solve the logical part, e.g., by running a simple function that determines which value is higher. This may be referred to as a "hybrid" solution. This type of solution can outperform pure DNN models by using analytic techniques and closed algorithms already implemented in external applications. Such external applications do not require learning, thereby using them should reduce the total amount of training data needed.

Training a DNN to interact with an external application through its API poses an inherent difficulty: most DNN training procedures rely on different variants of gradient backpropagation. Therefore, it is only possible to train them end-to-end if all solution parts are implemented as neural networks, or at least can return a valid gradient. Consequently, all parts of the overall solution must be differentiable.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a method comprising: during end-to-end training of a Deep Neural Network (DNN), operating a differentiable estimator subnetwork to estimate a functionality of an external software application.

Another embodiment provides a computer program product comprising a non-transitory computer-readable storage medium having program code embodied therewith, the program code executable by at least one hardware processor to: during end-to-end training of a Deep Neural Network (DNN), operate a differentiable estimator subnetwork to estimate a functionality of an external software application.

A further embodiment provides a system comprising: at least one hardware processor; and a non-transitory computer-readable storage medium having program code embodied therewith, the program code executable by said at least one hardware processor to: during end-to-end training of a Deep Neural Network (DNN), operate a differentiable estimator subnetwork to estimate a functionality of an external software application.

In some embodiments, the method or the instructions further comprise: during inference by the trained DNN, replacing the differentiable estimator subnetwork with the functionality of the external software application by enabling API communication between the DNN and the external software application.

In some embodiments, the end-to-end training is with stochastic gradient descent (SGD).

In some embodiments, the functionality of the external software application is non-differentiable.

In some embodiments, the functionality of the external software application is differentiable.

In some embodiments, the method or the instructions further comprise operating at least one selector subnetwork to: determine an Application Programming Interface (API) call to the external software application; and to extract suitable API arguments from an input to the DNN.

In some embodiments, the method or the instructions further comprise operating an adaptation function to: adapt an output format of the selector subnetwork to an input format required by the API; and adapt an output format of the API to an input format required by higher network layers of the DNN during inference.

In some embodiments, the differentiable estimator subnetwork embeds different data representations into a same vector space, to enable the DNN to handle the different data representations interchangeably.

In some embodiments, the different data representations comprise numbers and texts.

In some embodiments: the differentiable estimator subnetwork is trained prior to being operated during end-to-end training of the DNN; and the training of the differentiable estimator subnetwork is based on training data that are a generated input for the external software application.

In some embodiments, parameters of the differentiable estimator subnetwork are updated during the end-to-end training of the DNN.

In some embodiments: a loss value is calculated based on a label that is generated by the external software application during the end-to-end training of the DNN; and the calculated loss value is used in the end-to-end training of the DNN.

In some embodiments: the differentiable estimator subnetwork is trained prior to being operated during end-to-end training of the DNN; the training of the differentiable estimator subnetwork is based on training data that are a generated input for the external software application; a loss value is calculated based on a label that is generated by the external software application during the end-to-end training of the DNN; the calculated loss value is used in the end-to-end training of the DNN; and parameters of the differentiable estimator subnetwork are updated during the end-to-end training of the DNN.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a technique, embodied as a method, a system, and a computer program product, for integrating one or more external software application into a DNN. These external software applications may be differentiable or non-differentiable. During end-to-end training of the DNN, a differentiable estimator subnetwork is operated to estimate a functionality of each of the external software applications. The DNN is essentially trained to comply with the interface of the differentiable estimator subnetwork during an end-to-end optimization process.

Then, for inference by the trained DNN, each of the differentiable estimator subnetworks is replaced with its counterpart functionality of the external software application; for example, this may be achieved by enabling Application Programming Interface (API) communication between the DNN and the external software application, such that the DNN can access the external software application on demand.

This technique, advantageously, streamlines the process of integrating external software applications into DNNs. Replacing the differentiable estimator subnetwork with its external software application counterpart, rather than keeping the differentiable estimator subnetwork within the DNN, yields superior results during inference, as the experimental results below demonstrate.

The DNN model is termed, throughout this disclosure, "EstiNet". The differentiable estimator subnetwork is termed, throughout this disclosure, "EstiLayer". These terms are used merely for convenience.

Figure 1:
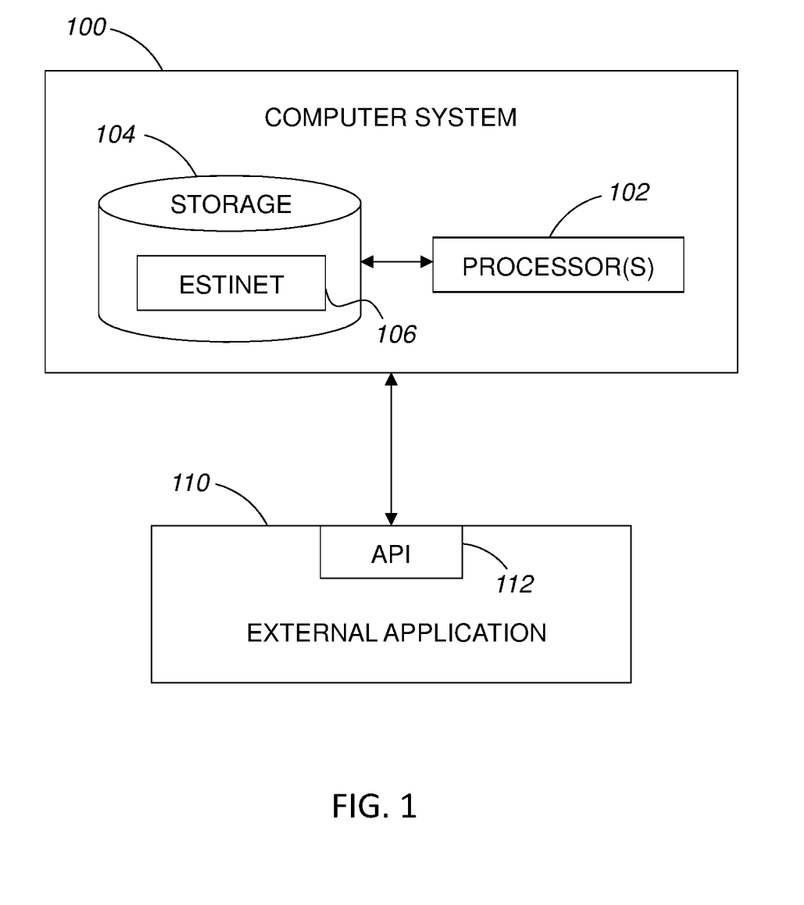
FIG. 1 shows a block diagram of an exemplary computer system integrating with an external application.

Reference is made to FIG. 1, which shows a block diagram of an exemplary computer system 100 that may execute the above technique in order to integrate with an external application 110 through an API 112 of the external application.

The external application may be differentiable or non-differentiable.

Computing system 100 may include one or more hardware processors 102 that are functionally associated with one or more storage devices 104. Storage device 104 is optionally a non-transient computer-readable storage medium, that stores instructions executable by hardware processor 102. The instructions, inter alia, are for executing EstiNet 106.

Not shown in this figure, but still optionally included in computer system 100, are I/O components such as a pointing device, a keyboard, a display, a touch screen, a network interface card (NIC), and/or the like.

Computer system 100 and external application 112 may communicate over a computer network, for example a local area network (LAN) or a wide area network (WAN) such as the Internet. Alternatively, external application 112 may be part of computer system 100, and reside in storage device 104 or a different storage device (not shown) of the computer system. In the latter case, external application 112 may be executed by hardware processor 102 or a different hardware processor (not shown) of the computer system.

Figure 2:
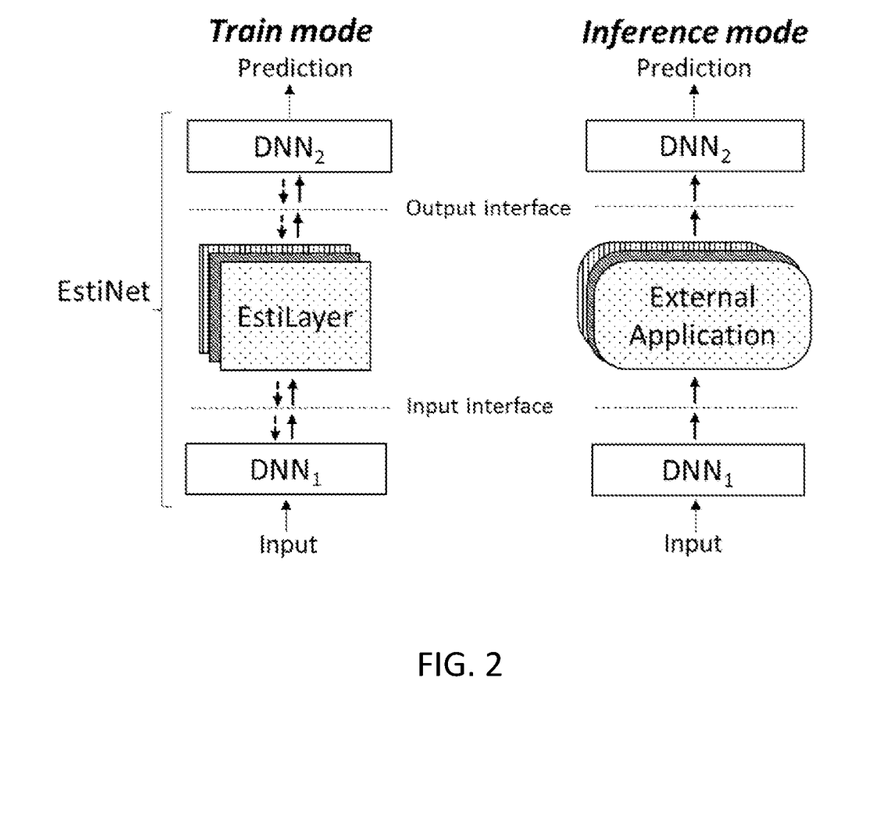
FIG. 2 shows a flow chart illustrating the present technique.

Reference is made to FIG. 2, which shows a flow chart illustrating the present technique. A rectangle represents a neural network, and a rectangle with rounded corners represent an external application. Solid arrows are for the forward pass and dashed arrows are for the back-propagation flow.

During training ("train mode"), the EstiLayers encourage the EstiNet to comply with the input and output interfaces of the predefined EstiLayers, in an end-to-end optimization process. Namely, EstiNet, being a DNN itself, learns the format, characteristics, and/or other aspects of the input and output interfaces of each EstiLayer. Essentially, EstiNet learns the API of the external application.

During inference ("inference mode"), namely—when EstiNet is deployed and used for analyzing real-world data and issuing predictions, the EstiLayers are replaced by the corresponding external applications. The replacement is made by tethering the input and output interfaces to the actual APIs of the external applications. Namely, the input interface transmits a query to the external application through its API, and the output interface receives a response to the query from the external application. Since the API was essentially learned during the previous training mode, EstiNet will seamlessly communicate with the external application whenever the logic of the external application is needed to answer a query.

As a simplistic example, consider how EstiNet will operate in the case discussed in the background section. In that case, the external application is a simple program for solving arithmetic problems. During inference, the input to $DNN_1$ may be the unstructured question "Is 7.2 greater than 4.5?" After suitable processing by $DNN_1$, EstiNet communicates with the external application through the input interface, and transmit to it a suitably-formatted query that requests it to estimate which value is larger. For example, a query in the form of "greater_than(7.2, 4.5)". The external application then processes the query using its preprogrammed logic, and outputs the response "7.2" through the output interface to $DNN_2$. Finally, $DNN_2$ issues a corresponding prediction.

In other words, EstiNet handles the natural language processing part, and access a simple API to solve the logical part, e.g., by running a simple function that determines which value is higher.

In more general terms, EstiNet may serve as a general-purpose DNN architecture, which may handle any type DNN assignment, while accessing external applications on demand. Examples of such assignments include natural language processing (NLP), computer vision, automatic speech recognition (ASR), machine translation, drug discovery and toxicology, media recommendation systems, bioinformatics, image restoration (e.g., denoising, super-resolution, inpainting), etc.

The technique described herein implies a DNN ability to learn an interface to an external application during training, and use it at inference time. This approach raises several challenges, all met in the framework of the disclosed technique.

One challenge is to access the correct API at the correct time. Selecting an API from a plurality of APIs is a discrete operation and thus, non-differentiable. This inherent discrete API selection poses a challenge when end-to-end training is desirable.

Another challenge is related to constraining the interface parameters. To adequately replace an EstiLayer with its application counterpart, the EstiLayer's interface needs to comply with the API's input and output parameters. Constraining an EstiLayer to an input and output definition as part of an end-to-end training process poses an additional layer to this challenge.

The EstiNet model will now be discussed in greater detail.

EstiNet may be defined by three conceptual subnetworks (also "layers"): Input representation, selectors, and EstiLayers. These three subnetworks provide the main building blocks required to solve a specific task. Next, we describe the main functionality of each of these three subnetworks.

In some embodiments, an input representation subnetwork, denoted $f_{in}(x)$, is defined and created. In some embodiments, an $f_{in}(x)$ subnetwork is defined, created and/or trained based on specifications and/or behavior of the relevant external applications and APIs. An output of an $f_{in}(x)$ subnetwork or layer enables a selector subnetwork (described next) to correctly extract information from an input to a DNN.

In some embodiments, a selector subnetwork, denoted $f_{sel}(\ )$, is defined and created such that it can determine which API to call, and extract the proper arguments from the input provided by the $f_{in}(x)$ subnetwork. In some embodiments, to discretely select an API from a set of APIs, $f_{sel}(\ )$ assigns a probability distribution over a set of classes (the APIs), and uses a function to select an API. Merely as an example, this function may be the one disused in Eric Jang, Shixiang Gu, and Ben Poole, "Categorical Reparameterization with Gumbel-Softmax", stat, 1050:1, 2017. Having selected an API, $f_{sel}(\ )$ extracts the input arguments from data provided by $f_{in}(x)$ as described.

In some embodiments, an EstiLayer is a subnetwork, denoted $f_{est}(\ )$, that estimates an API and its functionality. In some embodiments, an EstiLayer estimates or simulates an external, non-differentiable application, using a differentiable subnetwork, thus enabling end-to-end training of a DNN, e.g., using stochastic gradient descent (SGD) which cannot be used for DNNs that include non-differentiable components.

By forcing an EstiLayer to estimate an external application's functionality and comply with its API as described, embodiments of the invention enable replacing (e.g., at inference time) the EstiLayer with the actual external application (or its API) while keeping the overall functionality intact.

In some embodiments, EstiNet may benefit from additional functionality to interact with an external application. For example, numerical APIs (e.g., greater-than) use numbers as their arguments. Forcing an EstiLayer and a numerical API to have the same interface necessitates a compatible number representation. To this end, EstiNet has to represent a number in a format that can be translated to and from a concrete number. Moreover, many tasks require different representations, such as for numbers and texts. Thus, the present technique may embed both representations into the same vector space.

As another example, one or more adaptation functions may be used to adapt selector output to the required API input, and to adapt API output to the required input of higher network layers at inference time. The adaptation function may be non-differentiable; thus, it cannot be used during back-propagation. Nevertheless, EstiNet may use these functions for label generation during training while training.

The procedure of training a DNN, such as EstiNet, end-to-end, may be carried out by providing task labels as supervision. This supervision allows the model to learn the input-to-output mapping end-to-end, but does not provide any guidance for learning an application interface. Two exemplary enhanced training procedures are discussed herein, which may support the present approach: offline and online training.

Offline training may be a two-step procedure. First, an EstiLayer may be trained to estimate an application's functionality. Training data may be created by generating application input, and then record its output. The application input is the data transmitted to the application over the API, which then triggers processing by the application. For example, if the application is a simple multiple, then the transmitted data could be a pair of numbers whose multiplication is desired. The step of generating this data may include generating a large amount of random data. Second, the trained EstiLayer may be loaded into the EstiNet model, and the EstiNet is trained end-to-end while keeping the EstiLayer parameters (i.e., the learned weights for this layer of the DNN) fixed. The optimizer is allowed to update the EstiLayer parameters during the end-to-end training process, for example in accordance with some gradient scheme (e.g., stochastic gradient descent). This changes the learned interface with the selectors subnetwork.

Figure 3:
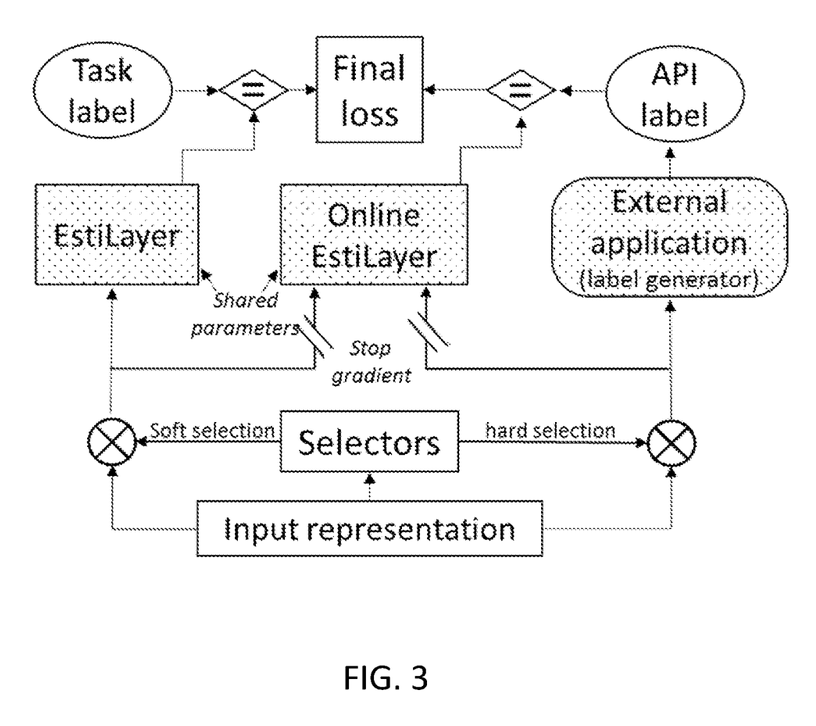
FIG. 3 shows a schematic diagram of an online training procedure.

Online training is a multi-task training procedure that jointly trains the EstiLayers and the whole EstiNet model. It calculates an additional loss value, based on a label that it generates online from the external application. Let x be some model input sample. Let $z_{soft}=f_{soft\_sel}(f_{in}(x))$ and $z_{hard}=f_{hard\_sel}(f_{in}(x))$ be the selectors' input to the EstiLayer interface while in soft and hard selection modes, respectively. Then, the EstiNet model prediction is defined to be $f_{model}(x)$, the soft online prediction $f_{online\_soft}$ to be fest($z_{soft}$), and the hard online prediction $f_{online\_hard}$ to be fest($z_{hard}$). Furthermore, y is defined as the task label for input sample x and $y_{api}=f_{api}(f_{adp}(z_{hard}))$ as the API label for the API input sample $z_{hard}$. Now, the total loss L may be defined to be:

$$L=L_{model}+\lambda_1 L_{online\_soft}+\lambda_2 L_{online\_hard},$$

where $\lambda_1$ and $\lambda_2$ are hyper-parameters of the model, and $$L_{model}=\text{loss}(f_{model},y),$$

$$L_{online\_soft}=\text{loss}(f_{online\_soft},y_{api}),$$

and $L_{online\_hard}=\text{loss}(f_{online\_hard},y_{api})$.

Reference is made to FIG. 3, which shows a schematic diagram of the online training procedure. A variant of the online training procedure is online-pretraining; here, the process starts by training the EstiLayers as in the offline training, and then use it during the online training. In FIG. 3, the model parameters are jointly optimized with respect to the task label (left side) and the EstiLayer parameters with respect to the application label (middle and right side). The gradients flow is stopped while optimizing the EstiLayer parameters with respect to the application label, and thus enforce it to retain application functionality. Note that the EstiLayer and the online EstiLayer share their parameters, and that the API label is generated online from the input to the EstiLayer and not from the task input.

Experimental Results

Experiments conducted by the inventors and described herein demonstrate the usability and efficacy of embodiments of the invention. Some embodiments of the invention may be configured based on certain experimental methods and/or experimental results; therefore, the following experimental methods and/or experimental results are to be regarded as embodiments of the present invention.

The present technique has been applied to a generated table-based, question-answering task (TAQ). We ran a supporting experiment on an auxiliary dataset to demonstrate the ability of the technique to learn from less data. In the following section, we provide the TAQ task description and a detailed implementation of the EstiNet model that solves it.

The TAQ Task

For the TAQ task we generated a table-based question answering dataset. The TAQ dataset input has two parts: a question and a table. To correctly answer a question from this dataset, the DNN has to access the right table column and apply non-differentiable logic on it using a parameter it extracts from the query. For example, consider a table that describes the number of medals won by each country during the last Olympics, and a query such as: "Which countries won more than 7 gold medals?" To answer this query, the DNN has to extract the argument (7 in this case) from the query, access the relevant column (namely, gold medals), and execute the 'greater than' operation with the extracted argument and column content (namely a vector of numbers) as its parameters. The operation's output vector holds the indices of the rows that satisfy the logic condition (greater-than in our example). The final answer contains the names of the countries (i.e., from the countries column) in the selected rows.

TAQ API

Solving the TAQ task requires five basic logic functions: equal-to, less-than, greater-than, max, and min. Each such function defines an API that is composed of two inputs and one output. The first input is a vector of numbers, namely, a column in the table. The second is a scalar, namely, an argument from the question or NaN if the scalar parameter is not relevant. The output is one binary vector, the same size as the input vector. The output vector indicates the selected rows for a specific query and thus provides the answer.

TAQ Data

We generated tables in which the first row contains column names and the first column contains a list of entities (e.g., countries, teams, products, etc.). Subsequent columns con-tamed the quantitative properties of an entity (e.g., population, number of wins, prices, discounts, etc.). Each TAQ-generated table consisted of 5 columns and 25 rows. We generated entity names (i.e., nations and clubs) for the first column by randomly selecting from a closed list. We generated values for the rest of the columns by sampling from a uniform distribution. We sampled values between 1 and 100 for the training set tables, and between 300 and 400 for the test set tables. We further created 2 sets of randomly generated questions that use the 5 API functions. The set includes 20,000 train questions on the train tables and 4,000 test questions on the test tables.

Input Representation

The TAQ input was composed of words, numbers, queries, and tables. The following describes the EstiNet representation for each of these elements.

Word Representation: EstiNet uses word pieces as in Yonghui Wu et al., "Google's neural machine translation system: Bridging the gap between human and machine translation", arXiv preprint arXiv:1609.08144, 2016, to represent words. A word is a concatenation of word pieces. EstiNet represents each word $wj \in \mathbb{R}^d$ as an average value of its piece embedding.

Number Representation: EstiNet aims to accurately represent a number and embed it into the same word vector space. Thus, its number representation follows the float32 scheme of William Kahan, IEEE standard 754 for binary floating-point arithmetic, 1996. Specifically, it starts by representing a number $a \in \mathbb{R}$ as a 32 dimension Boolean vector $s'_n$. It then adds redundancy factor r, $r*32<d$ by multiplying each of the $s'_n$ digits r times. Last, it pads the $s_n \in \mathbb{R}^d$ resulting vector with $d-r*32$ zeros. We tried several representation schemes. This approach resulted in the best EstiNet performance.

Query Representation: EstiNet represents a query q as a matrix of word embeddings and uses the LSTM model of Sepp Hochreiter and Jurgen Schmidhuber, "Long short-term memory", Neural Computation, 9(8):1735-1780, 1997, to encode the query matrix into a vector representation: $z_{lstm} \in \mathbb{R}^{d\_rnn} = h_{last}$ (LSTM(Q)), where $h_{last}$ is the last LSTM output and d_rnn is the dimension of the LSTM.

Table Representation: For the TAQ task, EstiNet represents a table $T \in \mathbb{R}^{n \times m \times d}$ with n rows and m columns as a three dimensional tensor. It represents a cell in a table as the piece average of its words.

Selectors

The EstiNet TAQ model uses three selector types: operation, argument, and column. Operation selectors select the correct API. Argument selectors select an argument from the query and hand it to the API. The column selector's role is to select a column from the table and hand it to the API. EstiNet implements each selector subnetwork as a classifier. Let $C \in \mathbb{R}^{c_n \times d_c}$ be the predicted class matrix, where the total number of classes is $c_n$ and each class is represented by a vector of size $d_c$. For example, for a selector that has to select a word from a sentence, the C matrix contains the word embeddings of the words in the sentence. One may consider various selector implementation options. We use a simple, fully connected network implementation in which $W \in \mathbb{R}^{d\_rnn \times c_n}$ is the parameter matrix and $b \in \mathbb{R}^{d_c}$ is the bias. We define $\beta = C \times (q_{lstm} \times W + b)$ to be the selector prediction before activation and $\alpha = f_{sel}(\cdot) = \text{softmax}(\beta)$ to be the prediction after the softmax activation layer. At inference time, the selector transforms its soft selection into a hard selection to satisfy the API requirements. EstiNet enables that using Gumbel Softmax hard selection functionality.

EstiLayers

The EstiNet TAQ model uses five EstiLayers to estimate each of the five logic operations. Each EstiLayer is a general-purpose subnetwork that we implement with a transformer network encoder as in Ashish Vaswani et al., "Attention is all you need", arXiv preprint arXiv:1706.03762, 2017. Specifically, we use $n \in \mathbb{N}$ identical layers, each of which consists of two sub-layers. The first is a multi-head attention with $k \in \mathbb{N}$ heads, and the second is a fully connected feed forward two-layer network, activated separately on each cell in the sequence. We then employ a residual connection around each of these two sub-layers, followed by layer normalization. Last, we apply linear transformation on the encoder output, adding bias and applying the Gumbel Softmax.

The performance of technique, as exhibited in the experiments, is now discussed. We start with the performance of the EstiNet model on the TAQ task. We then provide the performance results of offline and online training procedures and compare them with the plain training baseline. Last, we demonstrate the advantages of the present technique on learning from less data.

TAQ Performance

Figure 4A:
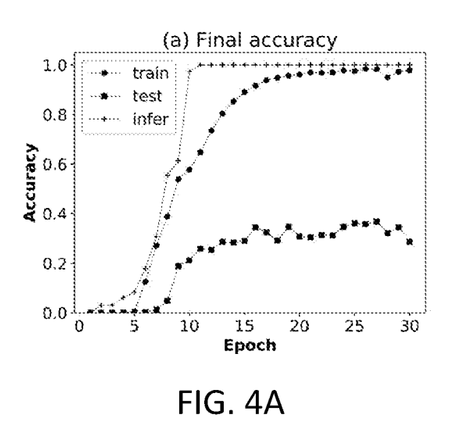
FIGS. 4A, 4B, 4C, and 4D show graphs of experimental results.

FIG. 4A depicts the TAQ accuracy of the three model configurations:
1. Train: train model and train dataset;
2. Test: train model and test dataset; and
3. Inference: inference model and test dataset.

Figure 4B:
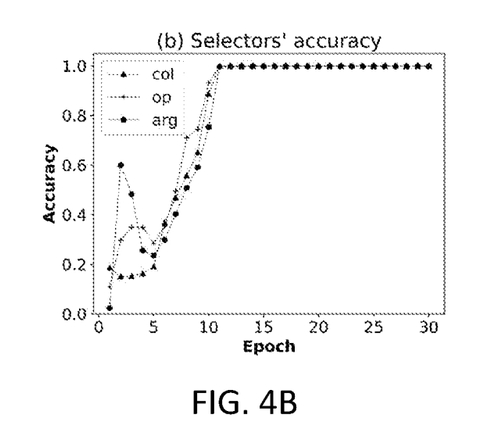
Figure 4C:
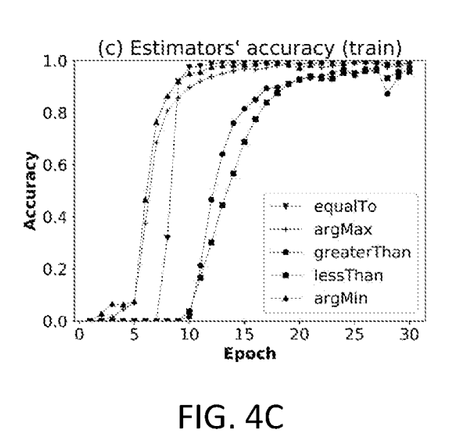
Figure 4D:
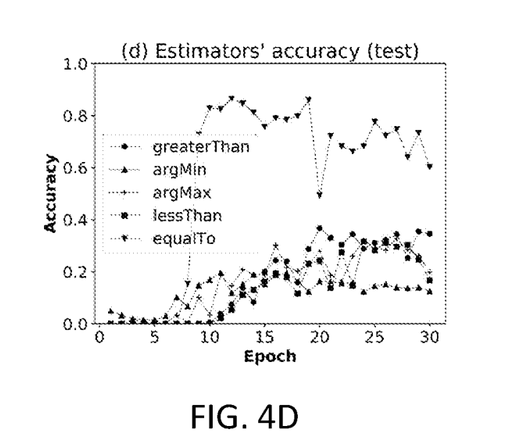

As shown, the train model accuracy on the train dataset reaches 95% after 20 epochs. Interestingly, inference accuracy on the test set is even higher and reaches 100%, while test accuracy is lower than 40%. The graph demonstrates the ability of the TAQ model to learn the logic interface despite its low generalization, indicated by the low test accuracy. Intermediate selector labels, which only exist for generated data, allow us to further assess selector accuracy in learning the interface with the estimators. FIG. 4B presents the per-epoch accuracy of the three selectors during model training. The figure shows the selectors' ability to perfectly learn the EstiLayers' interface after approximately 10 epochs. Selector test performance indicates the same (not shown in the figure). FIGS. 4C and 4D further assess EstiLayer accuracy in estimating the logic operation. The figures show that EstiLayers achieve near perfect accuracy on the train set, while test set performance is way below optimal. Most importantly, even though suboptimal Esti-Layer test performance drives the overall low model performance on the test set, it has no effect on model performance while in inference mode. Clearly, this is because during inference mode we replace each EstiLayer with its application counterpart.

Training Procedures

Table 1 summarizes the TAQ model performance throughout the training procedures described above.

TABLE 1

| Training mode | Train accuracy | Test accuracy | Inference accuracy |
|---|---|---|---|
| Plain | 0.9 | 0.11 | 0.08 |
| Offline | 0.09 | 0.02 | 0.17 |
| Offline-trainable | 0.97 | 0.22 | 0.33 |
| Online | 0.76 | 0.22 | 0.69 |
| One-pretraining | 0.98 | 0.47 | 0.98 |

The table presents the accuracy of the three model configurations: train, test, and inference with the three training procedures: plain, offline, and online. Offline-trainable is offline mode in which we allow the optimizer to continue to update EstiLayer parameters. Online-pretraining is online mode in which we pre-trained the EstiLayers as in the offline mode. Each value in the table is calculated as an average of 10 repeated experiments.

In plain training, which we use as our baseline (first row in the table), we train the TAQ model end-to-end without any additional constraints on the selector-estimator interface. As shown, the model can overfit the train set (0.9) but test set performance is low (0.11). Note that inference performance has no real meaning in that case, as there is no predefined selector-estimator interface. Thus, replacing the estimator with the external API makes no sense. Our main goal is to force a model to learn a predefined interface. To achieve that, we employ a two-step training procedure, which we refer to as offline training. We first train the estimators to overfit the train set and then use the trained estimator model during the end-to-end training process.

The second row in the table shows the result of the offline experiment. As shown, the model fails to fit the train set and shows only 0.09 accuracy. Moreover, low train model accuracy results in low inference performance (0.17). We hypothesized that fixing the estimator parameters during the end-to-end training process prevents the rest of the model from fitting the train set. Thus, we ran a third experiment, offline-trainable, which allows the optimizer to update EstiLayer parameters during the end-to-end training process. This enabled the model to successfully fit the train set (0.97) but derogated the interface accuracy at inference time (0.33). With that failure in mind, we looked for a way to let the model learn the TAQ task end-to-end and at the same time force the estimator to comply with a predefined interface.

We designed the online training procedure as a multi-task optimization process with two unrelated loss functions: 1) the task, and 2) the external functionality. In our first online training experiment (online entry in the table), we trained the estimators and the entire model without first initializing the estimator parameters. We assumed the estimators would gain their estimation functionality during the multi-task optimizing process. Indeed, this training procedure led to significant improvement in inference performance (0.69). However, the end-to-end model still faced difficulties in fitting the train set, gaining only 0.76 accuracy. To improve the end-to-end model learning performance, we experimented with the online-pretraining procedure (fifth line in the table), in which we started the end-to-end training process with trained estimator models. As indicated by the table, the improved on-line training procedure succeeded in fitting the train set (0.98) and achieved near perfect results at inference time (0.98). The low test set performance (0.47) is a phenomenon that usually indicates suboptimal model performance, (i.e., due to lack of data). However, in our case it demonstrates high generalization abilities in situations that lack data.

Learning from Less Data

To demonstrate the ability of the present technique to learn from less data, we ran an auxiliary experiment on a simpler dataset of greater-than/less-than questions. The questions came from 10 different templates, all requiring a true/false answer for 2 real numbers. For example: Out of x and y, is the first larger? where x, y are float numbers sampled from a $\sim \mathcal{N}(0, 10^{10})$ distribution.

The aim of this simple dataset was to demonstrate the ability of EstiNet to learn from less data. We compared the performance of the EstiNet model in plain and online training procedures. The plain training procedure served as a baseline and we measured its performance at test mode. This is because with plain training, the model does not learn to interact with external applications, thus, inference performance has no meaning. On the other hand, online training lets the DNN model learn to interact with external applications, thus, we can measure its inference performance.

Our experiment contained 5 train sets with 250, 500, 1,000, 5,000 or 10,000 questions and a test set with 1,000 questions. Table 2 summarizes the performance differences. The results show that with online training the model generalizes better and accuracy differences between the two training procedures increase as the amount of training data decreases. It is interesting to note that to achieve, for example, 0.97 accuracy, the online training only needs samples that are 5% of the data the plain training needs. We attribute the superiority of the EstiNet online training performance to its learning abilities. The model learns to interact with an external application to solve the logical part of the question.

TABLE 2

| Training set size | 250 | 500 | 1,000 | 5,000 | 10,000 |
|---|---|---|---|---|---|
| Plain | 0.533 | 0.686 | 0.859 | 0.931 | 0.98 |
| Online | 0.966 | 0.974 | 0.968 | 0.995 | 1.0 |
| Difference | 81% | 41% | 13% | 7% | 2% |

In conclusion, the present technique is an advantageous approach to overcoming the non-differentiability challenge, while integrating existing applications with DNNs. We use EstiLayers to estimate the external non-differentiable functionality. We then train the DNN end-to-end with the EstiLayers as functionality placeholders. The DNN learns the interface with the EstiLayers and uses it at inference time. Defining and learning an application interface, as well as learning when to use it, involves several non-differentiable aspects that must be overcome by the training process. These include hard selection, typed arguments, and functionality orchestration.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

The invention claimed is:

1. A method comprising:
    during end-to-end training of a Deep Neural Network (DNN), operating a differentiable estimator subnetwork to estimate a functionality of an external software application, wherein the estimation comprises learning an Application Programming Interface (API) of the external software application by learning a format and characteristics of input and output parameters of said API, and wherein said end-to-end training trains said DNN to comply with said estimation by said differentiable estimator subnetwork; and
    during inference, operating the trained DNN to interact directly, without using said differentiable estimator subnetwork, with said API, to cause said external software application to perform a specified task.

2. The method according to claim 1, wherein the end-to-end training is with stochastic gradient descent (SGD).

3. The method according to claim 1, wherein the functionality of the external software application is non-differentiable.

4. The method according to claim 1, wherein the functionality of the external software application is differentiable.

5. The method according to claim 1, further comprising operating at least one selector subnetwork to:
    determine an API call to the external software application; and
    extract suitable API arguments from an input to the DNN.

6. The method according to claim 5, further comprising operating an adaptation function to:
    adapt an output format of the selector subnetwork to an input format required by the API; and
    adapt an output format of the API to an input format required by network layers of the DNN during inference, wherein the network layers are higher, in the DNN, than the differentiable estimator subnetwork.

7. The method according to claim 1, wherein the differentiable estimator subnetwork embeds different data representations into a same vector space, to enable the DNN to handle the different data representations interchangeably.

8. The method according to claim 7, wherein the different data representations comprise numbers and texts.

9. The method according to claim 1, wherein:
    the differentiable estimator subnetwork is trained prior to being operated during end-to-end training of the DNN; and
    the training of the differentiable estimator subnetwork is based on training data that are a generated input for the external software application.

10. The method according to claim 9, wherein parameters of the differentiable estimator subnetwork are updated during the end-to-end training of the DNN.

11. The method according to claim 1, wherein:
    a loss value is calculated based on a label that is generated by the external software application during the end-to-end training of the DNN; and
    the calculated loss value is used in the end-to-end training of the DNN.

12. The method according to claim 1, wherein:
    the differentiable estimator subnetwork is trained prior to being operated during end-to-end training of the DNN;
    the training of the differentiable estimator subnetwork is based on training data that are a generated input for the external software application;
    a loss value is calculated based on a label that is generated by the external software application during the end-to-end training of the DNN;
    the calculated loss value is used in the end-to-end training of the DNN; and
    parameters of the differentiable estimator subnetwork are updated during the end-to-end training of the DNN.

13. A computer program product comprising a non-transitory computer-readable storage medium having program code embodied therewith, the program code executable by at least one hardware processor to:
    during end-to-end training of a Deep Neural Network (DNN), operate a differentiable estimator subnetwork to estimate a functionality of an external software application, wherein the estimation comprises learning an Application Programming Interface (API) of the external software application by learning a format and characteristics of input and output parameters of said API, and wherein said end-to-end training trains said DNN to comply with said estimation by said differentiable estimator subnetwork; and
    during inference, operating the trained DNN to interact directly, without using said differentiable estimator subnetwork, with said API, to cause said external software application to perform a specified task.

14. The computer program product according to claim 13, wherein:

the program code is further executable to calculate a loss value based on a label that is generated by the external software application during the end-to-end training of the DNN; and the calculated loss value is used in the end-to-end training of the DNN.

15. The computer program product according to claim 13, wherein:

the differentiable estimator subnetwork is trained prior to being operated during end-to-end training of the DNN;

the training of the differentiable estimator subnetwork is based on training data that are a generated input for the external software application;

a loss value is calculated based on a label that is generated by the external software application during the end-to-end training of the DNN;

the calculated loss value is used in the end-to-end training of the DNN; and parameters of the differentiable estimator subnetwork are updated during the end-to-end training of the DNN.

16. A system comprising:

at least one hardware processor; and a non-transitory computer-readable storage medium having program code embodied therewith, the program code executable by said at least one hardware processor to:

during end-to-end training of a Deep Neural Network (DNN), operate a differentiable estimator subnetwork to estimate a functionality of an external software application, wherein the estimation comprises learning an Application Programming Interface (API) of the external software application by learning a format and characteristics of input and output parameters of said API, and wherein said end-to-end training trains said DNN to comply with said estimation by said differentiable estimator subnetwork, and during inference, operating the trained DNN to interact directly, without using said differentiable estimator subnetwork, with said API, to cause said external software application to perform a specified task.

17. The system according to claim 16, wherein:

the program code is further executable by said at least one hardware processor to calculate a loss value based on a label that is generated by the external software application during the end-to-end training of the DNN; and the calculated loss value is used in the end-to-end training of the DNN.

* * * * *